(12) United States Patent
Kitaguchi

(10) Patent No.: US 8,534,038 B2
(45) Date of Patent: Sep. 17, 2013

(54) COMBINED POWER PLANT

(75) Inventor: Yoshinori Kitaguchi, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 863 days.

(21) Appl. No.: 12/077,000

(22) Filed: Mar. 26, 2008

(65) Prior Publication Data
US 2008/0236135 A1 Oct. 2, 2008

(30) Foreign Application Priority Data

Mar. 29, 2007 (JP) ................. 2007-088749

(51) Int. Cl.
*F02C 6/00* (2006.01)
(52) U.S. Cl.
USPC ............... 60/39.182; 60/39.3; 60/806
(58) Field of Classification Search
USPC ........... 60/39.53, 39.182, 39.15, 775, 772, 60/39.3, 806
See application file for complete search history.

(56) References Cited

U.S. PATENT DOCUMENTS

| 6,178,734 | B1 * | 1/2001 | Shibuya et al. | 60/772 |
| 6,339,926 | B1 * | 1/2002 | Ichiro et al. | 60/39.182 |
| 6,367,242 | B1 | 4/2002 | Uematsu et al. | |

FOREIGN PATENT DOCUMENTS

| JP | 9-112215 A | 4/1997 |
| JP | 10-047082 A | 2/1998 |
| JP | 10-73008 A | 3/1998 |
| JP | 10-331610 A | 12/1998 |
| JP | 11-93693 A | 4/1999 |
| JP | 11-148315 A | 6/1999 |
| JP | 11-159306 A | 6/1999 |
| JP | 3068925 B2 | 5/2000 |
| JP | 2000-248962 A | 9/2000 |
| JP | 2005-344528 A | 12/2005 |

OTHER PUBLICATIONS

Japanese Office Action dated Aug. 2, 2011, issued in corresponding Japanese Patent Application No. 2007-088749.

* cited by examiner

*Primary Examiner* — William H Rodriguez
*Assistant Examiner* — Steven Sutherland
(74) *Attorney, Agent, or Firm* — Westerman, Hattori, Daniels & Adrian, LLP

(57) ABSTRACT

A combined power plant that is capable of reducing the time required for restarting is provided. The combined power plant includes a gas turbine power generating unit having a gas turbine; a steam turbine power generating unit having a steam turbine; a steam supplying unit for supplying steam to the gas turbine and the steam turbine; a first steam pipe for guiding the steam from the steam supplying unit to the gas turbine; a second steam pipe for guiding the steam from the gas turbine to the steam supplying unit; a first control unit for controlling the inflow of the steam from the first steam pipe to the gas turbine; a second control unit for controlling the outflow of the steam from the gas turbine to the second steam pipe; a discharge unit for discharging the steam from inside the gas turbine to outside the gas turbine; a fluid supplying unit for introducing a fluid in order to push out the steam from inside the gas turbine; and a bypass pipe for guiding the steam in the first steam pipe to the second steam pipe.

3 Claims, 6 Drawing Sheets

COMBINED POWER PLANT

BACKGROUND OF THE INVENTION

1. Field of the Invention

The present invention relates to a combined power plant.

This application is based on Japanese Patent Application No. 2007-088749, the content of which is incorporated herein by reference.

2. Description of Related Art

Recently, many thermal power plants that use liquid natural gas as fuel are in use. Combined power plants that include both gas turbine plants and steam turbine plants are generally used as such thermal power plants.

With these combined power plants, electric power is generated by driving a power generator using a gas turbine. Simultaneously, heat exhausted from the gas turbine (exhaust heat) generates steam by causing condensed water from a condenser in an exhaust-heat recovery boiler to vaporize. The generated steam is supplied to a steam turbine to drive the steam turbine. The power generator generates electric power by being driven by the steam turbine. The gas turbine and the steam turbine may be formed of different shafts to drive different power generators, or the gas turbine, the steam turbine, and the power generator may be connected along a single shaft to constitute one power generating unit.

It is known that the heat efficiency (power generation efficiency) of the above-described power plant can be increased by increasing the temperature of inlet combustion gas to the gas turbine. However, when the temperature of the inlet combustion gas is increased, high-temperature sections of the gas turbine (for example, the combustor, the stator blade, and the rotor blade) may experience damage or melting caused due to heat. Therefore, a technique for preventing damage or melting caused due to heat by cooling the high-temperature sections of the gas turbine has been proposed (refer to Publication of Japanese Patent No. 3068925 and Japanese Unexamined Patent Application, Publication No. 2000-248962).

Publication of Japanese Patent No. 3068925 and Japanese Unexamined Patent Application, Publication No. 2000-248962 disclose techniques involving using steam as a cooling medium for cooling the high-temperature sections of the gas turbine.

If the pipes used for supplying the steam (cooling steam system) are cool when steam is used as a cooling medium, drainage liquid, such as water drops, is generated due to condensation of part of the steam. The water drops may be guided together with the steam to the high-temperature sections of the gas turbine and may make contact therewith. The high-temperature sections of the gas turbine where the water drops make contact are locally cooled, and the durability may decrease due to thermal stress. Furthermore, since the high-temperature sections of the gas turbine have a complex cooling structure, there is a tendency to accumulate drainage liquid.

The cooling steam system is cold during start-up and shut down of the gas turbine plant.

There is a known method of preventing generation of water drops when the gas turbine is shut down by introducing dry gas to the cooling steam system and the gas turbine after the gas turbine is shut down so as to push out steam from the cooling steam system.

In many cases, however, because the temperature of the dry gas is lower than that of the steam, the temperature of the cooling steam system may decrease by introducing the dry gas thereto. Consequently, when the gas turbine plant is restarted, the pipes must be heated (warming must be performed) by passing steam through the cooling steam system again for a predetermined amount of time, thus causing a problem in that a long period of time is required for restarting.

In particular, there is a problem in that a long period of time is required for restarting the gas turbine plant after a relatively short shut down period, such as a weekly start and stop (WSS) and a daily start and stop (DSS).

BRIEF SUMMARY OF THE INVENTION

The present invention has been conceived in light of the problems described above. Accordingly, it is an object of the present invention to provide a combined power plant that is capable of reducing the time required for restarting.

To achieve the above-described objects, the present invention provides the following solutions.

The present invention provides a combined power plant including a gas turbine power generating unit having a gas turbine; a steam turbine power generating unit having a steam turbine; a steam supplying unit configured to supply steam to the gas turbine and the steam turbine; a first steam pipe configured to guide the steam from the steam supplying unit to the gas turbine; a second steam pipe configured to guide the steam from the gas turbine to the steam supplying unit; a first control unit configured to control the inflow of the steam from the first steam pipe to the gas turbine; a second control unit configured to control the outflow of the steam from the gas turbine to the second steam pipe; a discharge unit configured to discharge the steam from inside the gas turbine to outside the gas turbine; a fluid supplying unit configured to introduce a fluid in order to push out the steam from inside the gas turbine; and a bypass pipe configured to guide the steam in the first steam pipe to the second steam pipe.

According to the present invention, when the gas turbine power generating unit is shut down the gas turbine is disconnected from the first steam pipe and the second steam pipe, and the first steam pipe is connected to the second steam pipe via the bypass pipe. Since the second steam pipe is connected to the first steam pipe and the steam supplying unit via the bypass pipe, the steam temperature in the second steam pipe does not decrease so much.

Fluid is supplied from the fluid supplying unit to the disconnected gas turbine, and the steam inside the gas turbine is pushed outside the discharge unit. At the same time, the steam inside the first and second steam pipes accumulates inside the first and second steam pipes even when the gas turbine power generating unit is shut down. Consequently, when restarting the gas turbine power generating unit, the amount of time required for warm-up is reduced and the amount of steam supplied from the steam supplying unit is reduced compared with when steam inside the first and second steam pipes and the gas turbine is pushed out.

According to the present invention, it is preferable that the bypass pipe be provided with a third control unit configured to control the flow of the steam.

In this way, when the gas turbine power generating unit is operated, the third control unit prevents steam from flowing from the first steam pipe through the bypass pipe to the second steam pipe. Therefore, all of the steam in the first steam pipe flows into the gas turbine, thus providing satisfactory cooling of the high-temperature section of the gas turbine. On the other hand, when the gas turbine power generating unit is shut down, steam flows from the first steam pipe through the bypass pipe to the second steam pipe.

According to the present invention, it is preferable that the second control unit include a check valve configured to allow a fluid to flow only in the direction from the gas turbine to the second steam pipe.

In this way, compared with when an on-off valve is used as the second control unit, steam can be prevented from flowing from the second steam pipe to the gas turbine without opening or closing a valve. Since an inexpensive check valve is used, production costs of the combined power plant can be reduced.

According to the present invention, it is preferable that the first control unit include a check valve configured to allow a fluid to flow only in the direction from the first steam pipe to the gas turbine, and a pressure regulating unit configured to regulate the pressure of the steam be provided in the first steam pipe interposed between the steam supplying unit and the first control unit.

In this way, compared with when an on-off valve is used as the first control unit, steam is prevented from flowing into the gas turbine by merely supplying fluid with a pressure higher than that of the steam to the gas turbine. Therefore, it is easy to control the flow in the first control unit. Since an inexpensive check valve is used, production costs of the combined power plant can be reduced.

Since the pressure of the steam applied to the first control unit is decreased by the pressure regulating unit, the pressure of the fluid supplied to the gas turbine is decreased. Therefore, the supply pressure required for the air supplying unit can be kept low.

The present invention is advantageous in that the steam temperature in the first steam pipe and the second steam pipe does not decrease so much. when the gas turbine power generating unit is shut down because the gas turbine is disconnected from the first steam pipe and the second steam pipe, and the second steam pipe is connected to the first steam pipe via the bypass pipe. Therefore, the amount of time required for restarting can be reduced.

DETAILED DESCRIPTION OF THE INVENTION

First Embodiment

A combined power plant according to a first embodiment of the present invention will be described below with reference to FIGS. 1 to 3.

Figure 1:
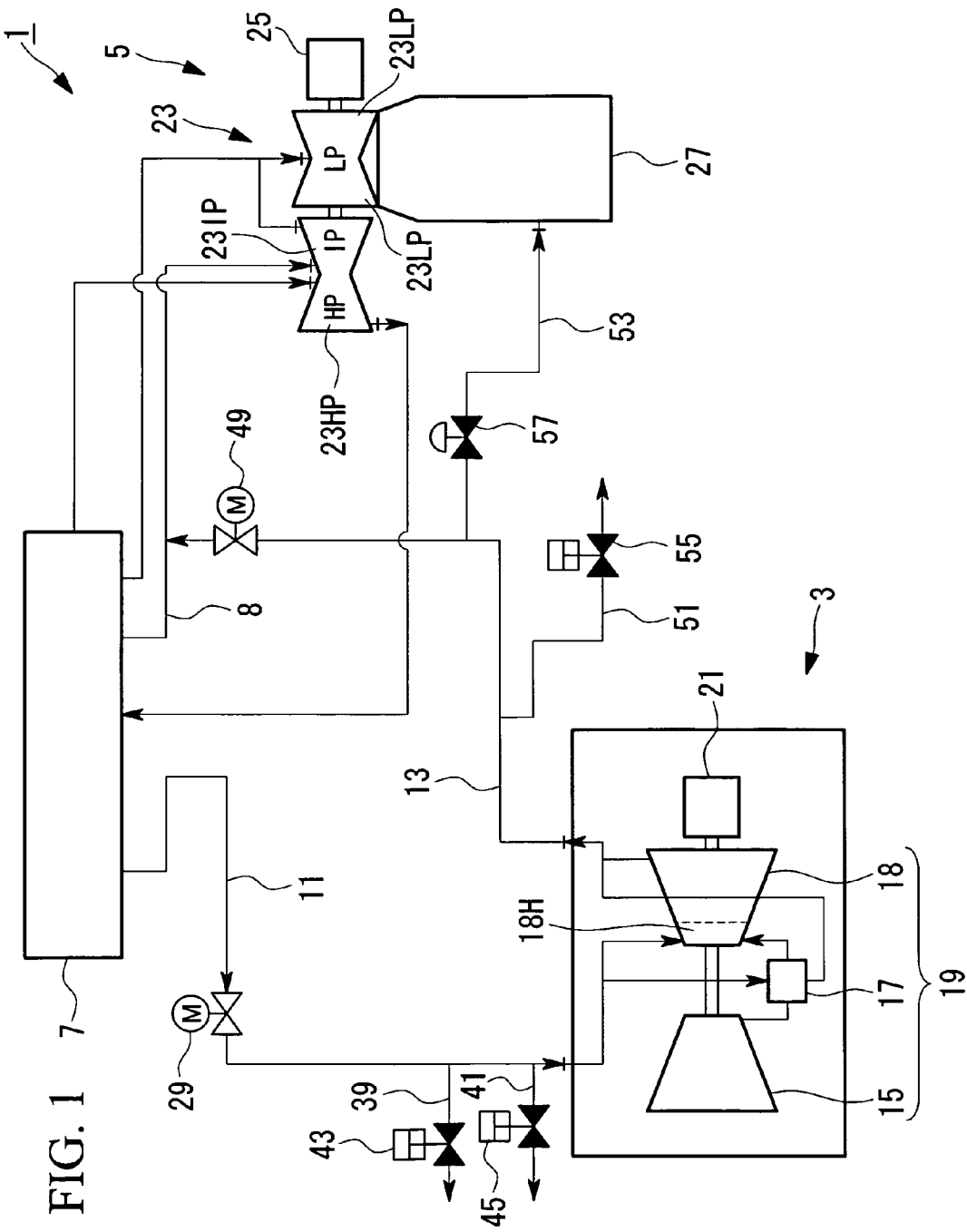
FIG. 1 illustrates, in outline, a combined power plant according to a first embodiment of the present invention.

FIG. 1 illustrates, in outline, a combined power plant according to this embodiment.

As shown in FIG. 1, a combined power plant 1 includes a gas turbine power generating unit 3 having a gas turbine 19, a steam turbine power generating unit 5 having a steam turbine 23, an exhaust-heat recovery boiler (steam supplying unit) 7 that supplies steam, and a first steam pipe 11 and a second steam pipe 13 that guide the steam.

The gas turbine power generating unit 3 generates electricity by rotating the gas turbine 19 and using the rotational driving force of the gas turbine 19 by using liquid natural gas and so on as fuel. As shown in FIG. 1, the gas turbine power generating unit 3 includes a compressor 15, a combustor 17, a turbine 18, and a gas turbine generator 21.

The compressor 15 is rotationally driven by the turbine 18 to take in air and supply compressed air to the combustor 17.

The combustor 17 generates combustion gas with high temperature and high pressure by mixing the compressed air supplied from the compressor 15 with the fuel and combusting the mixed gas.

The turbine 18 rotationally drives the compressor 15 and the gas turbine generator 21 by using the combustion gas supplied from the combustor 17. Channels (not shown) for transporting cooling steam (described below) are formed in the combustor 17 in the gas turbine 19 and in a stator vane and a rotor blade of the gas turbine 19 near the inlet of the combustion gas (high-temperature section 18H of the turbine 18).

The components, such as the gas turbine 19, included in the gas turbine power generating unit 3 are not particularly limited, and any known component may be used.

The steam turbine power generating unit 5 generates electricity by rotating the steam turbine 23 and using the rotational driving force of steam turbine 23 by using the steam supplied from the exhaust heat recovery boiler 7 and so on. The steam turbine power generating unit 5 includes a steam turbine 23, a steam turbine generator 25, and a condenser 27.

The steam turbine 23 rotationally drives the steam turbine generator 25 using the steam supplied from the exhaust-heat recovery boiler 7 and the steam supplied through the gas turbine 19. In this embodiment, the steam turbine 23 is constituted of three sections: a high-pressure steam turbine 23HP, an intermediate-pressure steam turbine 23IP, and a low-pressure steam turbine 23LP.

The condenser 27 condenses the steam used for rotationally driving the steam turbine 23 into water. More specifically, steam discharged from the low-pressure steam turbine 23LP is guided to the condenser 27.

The components used in the steam turbine power generating unit 5, such as the steam turbine 23, are not particularly limited, and any known component may be used.

The exhaust-heat recovery boiler (heat recovery steam generator (HRSG)) 7 generates steam using heat (exhaust heat) included in the combustion gas (exhaust gas) from the gas turbine 19. The generated steam is supplied to the steam turbine power generating unit 5 where it is used to rotationally drive the steam turbine 23 and is also supplied to the gas turbine 19 where it is used to cool the combustor 17, the high-temperature section 18H, and so on.

FIG. 1 shows a configuration in which the gas turbine 19 and the steam turbine 23 drive the gas turbine generator 21 and the steam turbine generator 25, respectively. However, the configuration is not limited thereto, and the gas turbine, the steam turbine, and the power generators may be connected along a single shaft to constitute one power generating unit (this configuration is not shown).

Figure 2:
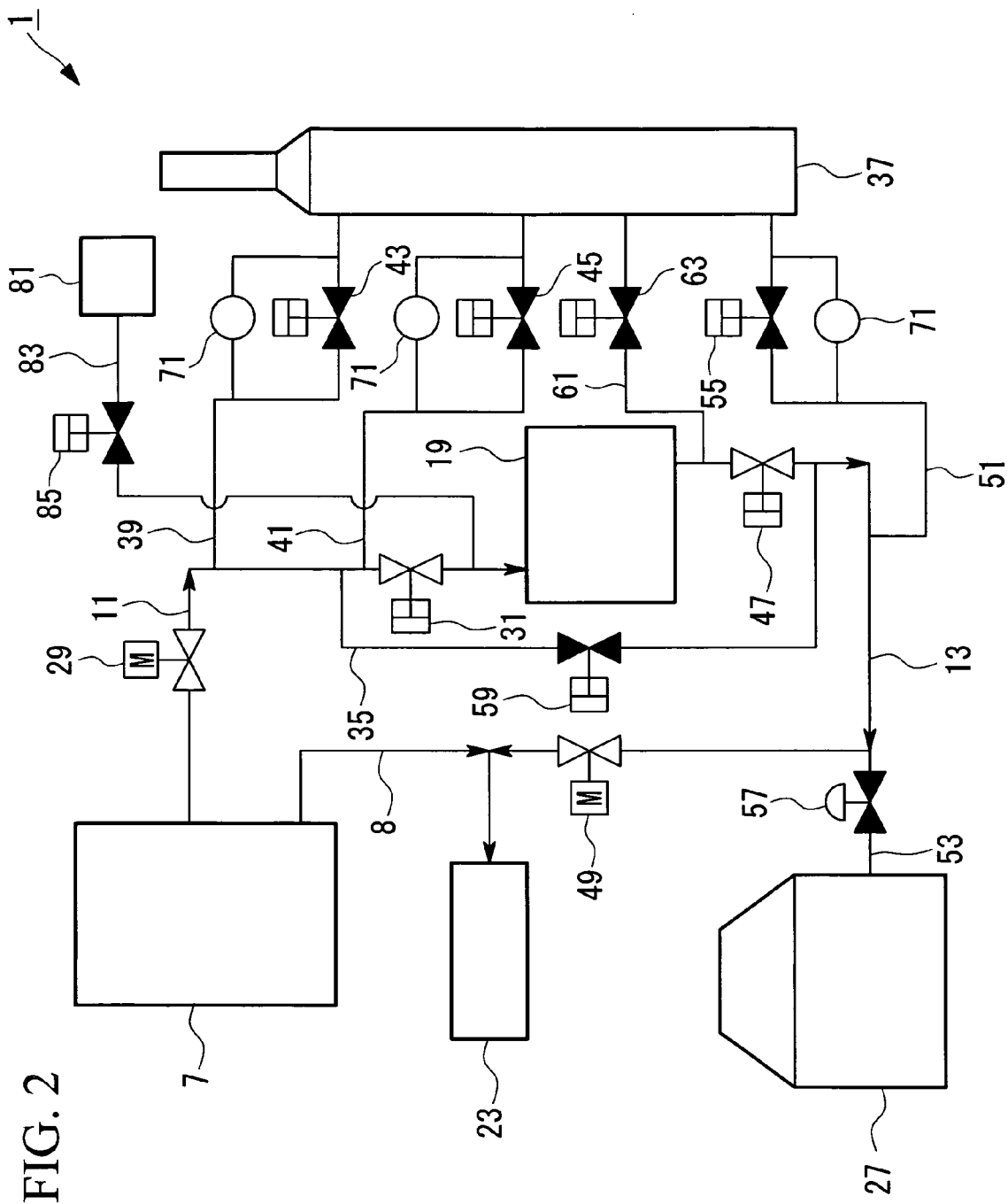
FIG. 2 is a schematic view of the combined power plant shown in FIG. 1.

FIG. 2 is a schematic view of the combined power plant shown in FIG. 1.

As shown in FIG. 2, the first steam pipe 11 supplies the steam generated at the exhaust-heat recovery boiler 7 to the gas turbine 19 of the gas turbine power generating unit 3. The first steam pipe 11 includes, in order from the exhaust-heat recovery boiler 7, a first motor valve 29 and a first on-off valve (first control unit) 31. The opening and closing of the first motor valve 29 is controlled by a motor. The first motor valve 29 connects and disconnects the exhaust-heat recovery boiler 7 and the first steam pipe 11. The first on-off valve 31 connects and disconnects the first steam pipe 11 and the gas turbine 19.

In order from the first motor valve 29 to the first on-off valve 31, the first steam pipe 11 is connected to a first discharge pipe 39 that guides the steam to a flush pipe 37, a bypass pipe 35 that guides the steam to the second steam pipe 13, and a second discharge pipe 41 that guides the steam to the flush pipe 37.

The position of the bypass pipe 35 is not limited and, as described above, it may be interposed between the first discharge pipe 39 and the second discharge pipe 41, disposed upstream of the first discharge pipe 39, or disposed downstream of the second discharge pipe 41.

An air supplying pipe 83 that supplies dry air from an air supplying unit (fluid supplying unit) 81 is connected to the first steam pipe 11 between the first on-off valve 31 and the gas turbine 19. An air supplying valve 85 that controls the dry air flow is disposed in the air supplying pipe 83.

The air supplying unit 81 is not particularly limited, and as described above, may supply dry air or may supply another fluid, such as dry nitrogen.

A first discharge valve 43 that controls the discharge of steam is disposed in the first discharge pipe 39, and a second discharge valve 45 that controls the discharge of steam is disposed in the second discharge pipe 41.

It is preferable that the first and second discharge valves 43 and 45 be disposed in the first and second discharge pipes 39 and 41, respectively, near the first steam pipe 11. However, their positions are not limited. The first and second discharge valves 43 and 45 are not particularly limited, and known valves, such as on-off valves, that control gas flow may be used.

As shown in FIG. 2, the second steam pipe 13 supplies the steam from the gas turbine 19 of the gas turbine power generating unit 3 to the steam turbine 23 of the steam turbine power generating unit 5. A second on-off valve (second control unit) 47 and a second motor valve 49 are provided on the second steam pipe 13, in this order from the gas turbine 19 side.

The second on-off valve 47 connects and disconnects the second steam pipe 13 and the gas turbine 19. The opening and closing of the second motor valve 49 is controlled by a motor. The second motor valve 49 connects and disconnects the second steam pipe 13 and the steam turbine 23.

The second steam pipe 13 is connected to the bypass pipe 35, a third discharge pipe 51 that guides the steam to the flush pipe 37, and a fourth discharge pipe 53 that guides the steam to the condenser 27, in this order from the second on-off valve 47 to the second motor valve 49. A steam supplying pipe 8 that supplies the steam from the exhaust-heat recovery boiler 7 to the steam turbine 23 is connected to the second steam pipe 13 that supplies the steam from the second motor valve 49 to the steam turbine 23.

By guiding the steam in the second steam pipe 13 to the condenser 27 through the fourth discharge pipe 53, the amount of water used can be reduced compared with other methods in which the steam is discharged into the atmosphere, since the steam (water) is recovered at the condenser 27.

A fifth discharge pipe (discharge unit) 61 that guides dry air and so on to the flush pipe 37 is connected to the second steam pipe 13 between the gas turbine 19 and the second on-off valve 47. A fifth discharge valve (discharge unit) 63 that controls the flow of the dry air and so on is disposed in the fifth discharge pipe 61.

A third discharge valve 55 that controls the discharge of steam is disposed in the third discharge pipe 51, and a fourth discharge valve 57 that controls the discharge of steam is disposed in the fourth discharge pipe 53.

It is preferable that the third and fourth discharge valves 55 and 57 be disposed in the third and fourth discharge pipes 51 and 53, respectively, near the second steam pipe 13. However, their positions are not limited. The third and fourth discharge valves 55 and 57 are not particularly limited, and known valves, such as on-off valves, that control gas flow may be used.

The bypass pipe 35 allows communication between the first steam pipe 11 and the second steam pipe 13. A bypass valve (third control unit) 59 that controls the communication of steam is disposed in the bypass pipe 35. The bypass valve 59 controls the steam flow in the bypass pipe 35 by opening and closing the bypass pipe 35.

The flush pipe 37 is a cylindrical member that discharges, into the atmosphere, steam guided from the first discharge pipe 39, the second discharge pipe 41, the third discharge pipe 51, and the fifth discharge pipe 61. A drain unit (not shown) that drains the condensed water accumulated in the flush pipe 37 is provided in the flush pipe 37.

Figure 3:
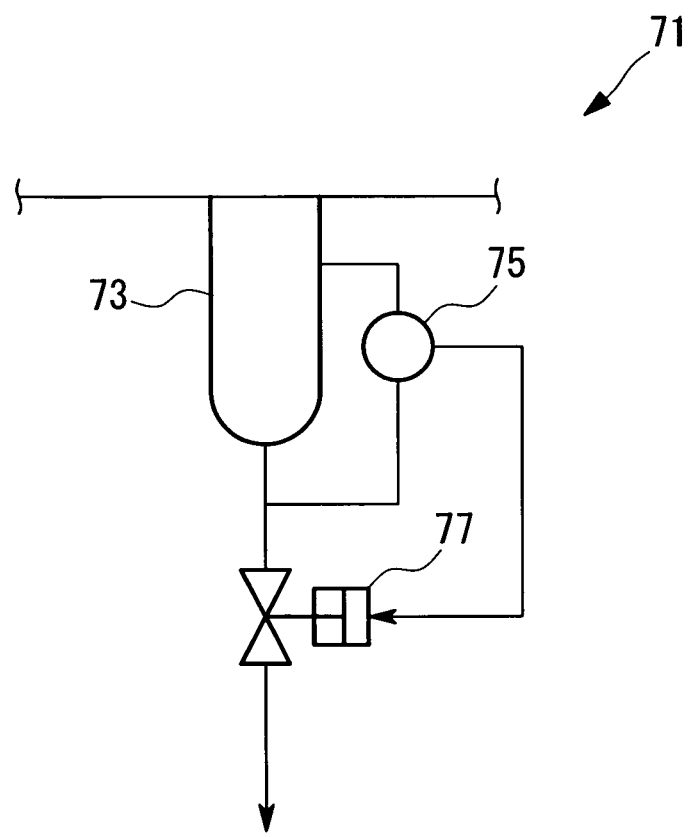
FIG. 3 is a schematic view illustrating the structure of a drain pot shown in FIG. 2.

FIG. 3 is a schematic view illustrating the structure of a drain pot shown in FIG. 2.

In FIG. 2, drain pots 71 that separate, from the steam, condensed water acquired by the steam condensing is disposed on the first discharge pipe 39, the second discharge pipe 41, and the third discharge pipe 51.

As shown in FIG. 3, the drain pot 71 includes a pot 73 that retains condensed water, a level sensor 75 that detects the water level of the retained condensed water, and a drain valve 77 that discharges the condensed water in the pot 73. The pot 73 stores the condensed water separated from the steam flowing through the first discharge pipe 39, the second discharge pipe 41, and the third discharge pipe 51. The level sensor 75 is provided on the pot 73. The level sensor 75 detects whether or not a predetermined amount of condensed water has accumulated in the pot 73. The output of the level sensor 75 is input to the drain valve 77. The drain valve 77 discharges the condensed water in the pot 73 on the basis of the output from the level sensor 75.

The drain pots 71 are not particularly limited, and, as described above, the drain pots 71 may be provided on the first discharge pipe 39, the second discharge pipe 41, and the third discharge pipe 51, or the drain pots 71 may not be provided at all. Instead of drain pots, drain traps may be provided. The drain traps are not particularly limited, and any known drain trap may be used.

Next, a method of generating electric power during normal operation of the combined power plant 1, having the above configuration, will be described.

As shown in FIG. 1, the combined power plant 1 generates electric power at the gas turbine power generating unit 3 and the steam turbine power generating unit 5.

The compressor 15 of the gas turbine power generating unit 3 takes in and compresses air, and supplies the compressed air to the combustor 17. The compressed air flows into the combustor 17 and is mixed with fuel. The mixed gas is combusted at the combustor 17 in order to generate high temperature and high pressure combustion gas. The combustion gas flows into the turbine 18 to rotationally drive the turbine 18. The rotational driving force of the turbine 18 is transmitted to the compressor 15 and the gas turbine generator 21. The compressor 15 compresses air by being rotationally driven as described above and sends the compressed air to the combustor 17. The gas turbine generator 21 generates electric power by being rotationally driven.

The combustion gas whose temperature is lowered by rotationally driving the turbine 18 is discharged from the gas turbine 19 as exhaust gas. The exhaust gas flows into the exhaust-heat recovery boiler 7 where steam is generated from water heated by the exhaust gas (exhaust heat).

A large portion of the generated steam is supplied to the steam turbine 23 of the steam turbine power generating unit 5 in order to rotationally drive the steam turbine 23. More specifically, the steam is first supplied to the high-pressure steam turbine 23HP in order to drive it. Then, the steam is supplied, in the stated order, to the intermediate-pressure steam turbine 23IP and the low-pressure steam turbine 23LP to rotationally drive the intermediate-pressure steam turbine 23IP and the low-pressure steam turbine 23LP.

Part of the generated steam is supplied to the combustor 17, the high-temperature section 18H, and so on of the gas turbine 19 through the first steam pipe 11. The supplied steam cools the combustor 17, the high-temperature section 18H, and so on and is discharged from the gas turbine 19. The discharged steam flows into the steam turbine 23 of the steam turbine power generating unit 5 through the second steam pipe 13 in order to rotationally drive the steam turbine 23.

The rotational driving force of the steam turbine 23 is transmitted to the steam turbine generator 25, and electric power is generated by the steam turbine generator 25. The steam discharged from the steam turbine 23 flows into the condenser 27 and is condensed at the condenser 27. The condensed water is sent to the exhaust-heat recovery boiler 7 where it evaporates into steam again. The above-described process is repeated.

Next, the operation from temporary shut down to restarting, characterizes the combined power plant 1 according to this embodiment, will be described.

Figure 4:
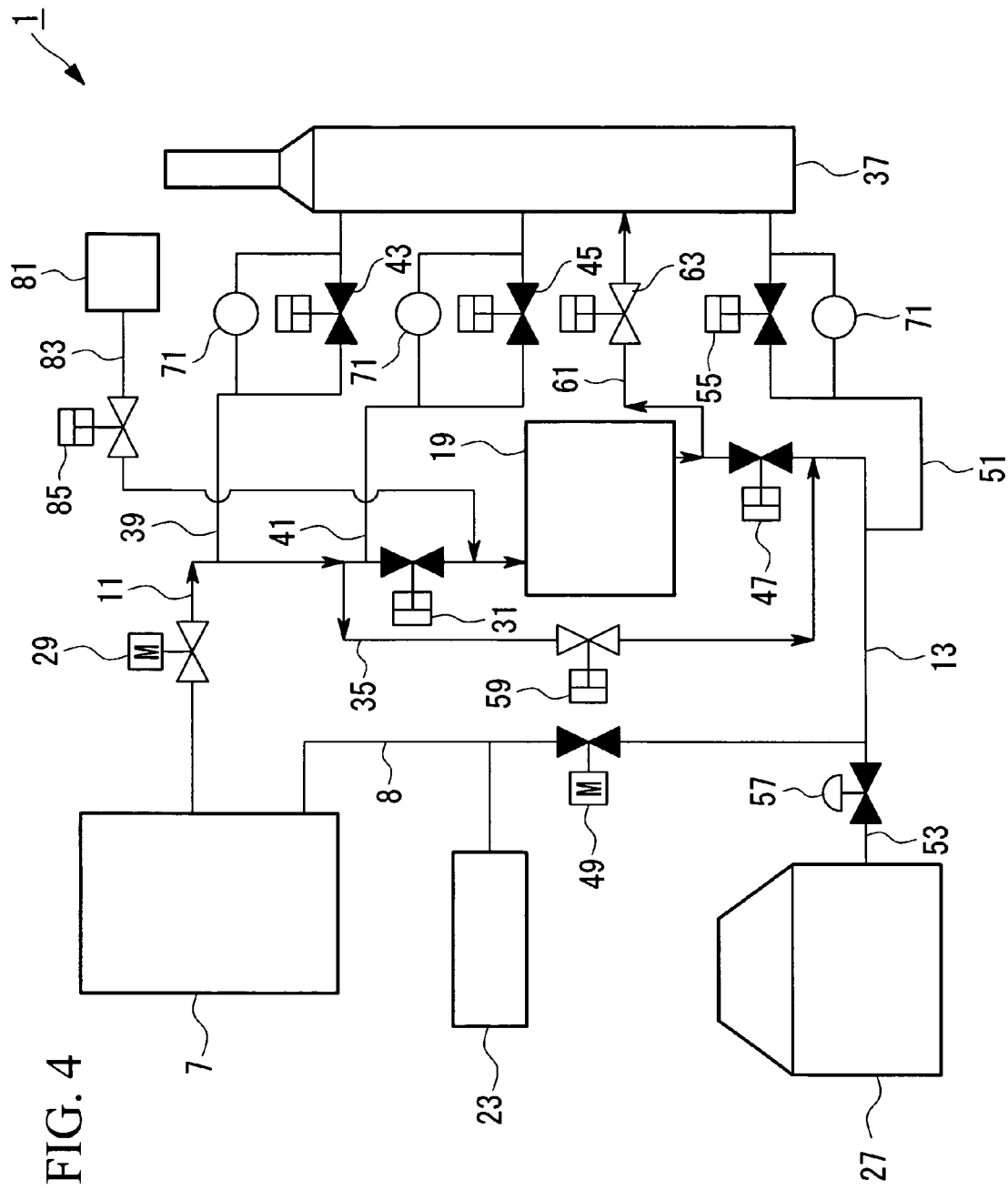
FIG. 4 is a schematic view illustrating the flow of steam at start-up of the combined power plant shown in FIG. 2.

FIG. 4 is a schematic view illustrating the flow of steam at start-up of the combined power plant shown in FIG. 2. The black valves shown in FIG. 4 represent closed valves, whereas the white valves shown in the drawing represent open valves.

When the combined power plant 1 is shut down temporarily, the first on-off valve 31, the second on-off valve 47, the second motor valve 49, the first discharge valve 43, the second discharge valve 45, the third discharge valve 55, and the fourth discharge valve 57 are closed, as shown in FIG. 4.

The first motor valve 29, the bypass valve 59, the fifth discharge valve 63, and the air supplying valve 85 are opened.

In this state, the air supplying unit 81 supplies dry air to the gas turbine 19 of the gas turbine power generating unit 3 and pushes out the steam in the gas turbine 19 into the atmosphere through the fifth discharge pipe 61 and the flush pipe 37. At this time, steam fills the first and second steam pipes 11 and 13 and the bypass pipe 35.

While the combined power plant 1 is shut down, the operation of the air supplying unit 81 is not limited, and the air supplying unit 81 may continue to supply dry air or may stop supplying dry air after the steam in the gas turbine 19 is pushed out. When the air supplying unit 81 continues to supply dry air, even if steam enters from the first and second steam pipes 11 and 13, the steam may be discharged, together with the dry air, from the flush pipe 37. When the dry air supply is stopped, the steam inside the gas turbine 19 only needs to be replaced with dry air, and therefore, the air supplying unit 81 requires a lower air-supply capacity.

Subsequently, when the combined power plant 1 is restarted, first the gas turbine power generating unit 3 is started up, and then the steam turbine power generating unit 5 is started up.

When starting up the gas turbine power generating unit 3, the first on-off valve 31 is opened and the air supplying valve 85 is closed after warm-up of the first steam pipe 11 is completed. In this way, the dry air in the gas turbine 19 is replaced with steam. Then, the bypass valve 59 and the fifth discharge valve 63 are closed, and the second on-off valve 47 and the fourth discharge valve 57 are opened. The steam flows from the first steam pipe 11 through the gas turbine 19 and the second steam pipe 13 to the condenser 27. While the steam continues to be recovered to the condenser 27, when steam conditions are set, the second motor valve 49 is opened to allow the steam to flow into the steam turbine 23.

According to the above-described structure, when the gas turbine power generating unit 3 is shut down, the gas turbine 19 is disconnected from the first steam pipe 11 and the second steam pipe 13, and the first steam pipe 11 is connected to the second steam pipe 13 via the bypass pipe 35. Since the second steam pipe 13 is connected to the first steam pipe 11 and the exhaust-heat recovery boiler 7 via the bypass pipe 35, the steam temperature in the second steam pipe 13 does not decrease so much.

Consequently, when the combined power plant 1 is restarted, the first and second steam pipes 11 and 13 do not need to be warmed up, thus reducing the amount of time required for restarting.

Dry air is supplied from the air supplying unit 81 to the disconnected gas turbine 19, and the steam inside the gas turbine 19 is pushed out to the atmosphere through the fifth discharge pipe 61 and the flush pipe 37. The steam inside the first and second steam pipes 11 and 13 stays inside the first and second steam pipes 11 and 13 even when the gas turbine power generating unit 3 is shut down. Therefore, when the gas turbine power generating unit 3 is restarted, the amount of steam supplied from the exhaust-heat recovery boiler 7 is reduced compared with when the steam inside the first and second steam pipes 11 and 13 and the gas turbine 19 is pushed out, thus reducing the amount of time required for restart.

With the combined power plant 1 according to this embodiment, when the gas turbine power generating unit 3 is operated, the bypass valve 59 prevents steam from flowing from the first steam pipe 11 into the second steam pipe 13 through the bypass pipe 35. Therefore, all of the steam inside the first steam pipe 11 flows into the gas turbine 19, thus preventing unsatisfactory cooling of the combustor 17, the high-temperature section 18H, and so on. When the gas turbine power generating unit 3 is shut down, steam flows from the first steam pipe 11 into the second steam pipe 13 through the bypass pipe 35.

Second Embodiment

Next, a second embodiment of the present invention will be described with reference to FIG. 5.

The basic structure of the combined power plant according to this embodiment is the same as that according to the first embodiment. However, the structure of the second steam pipe differs from that according to the first embodiment. Therefore, in this embodiment, only the second steam pipe and its periphery will be described with reference to FIG. 5, and the structures of the other components will not be described again.

Figure 5:
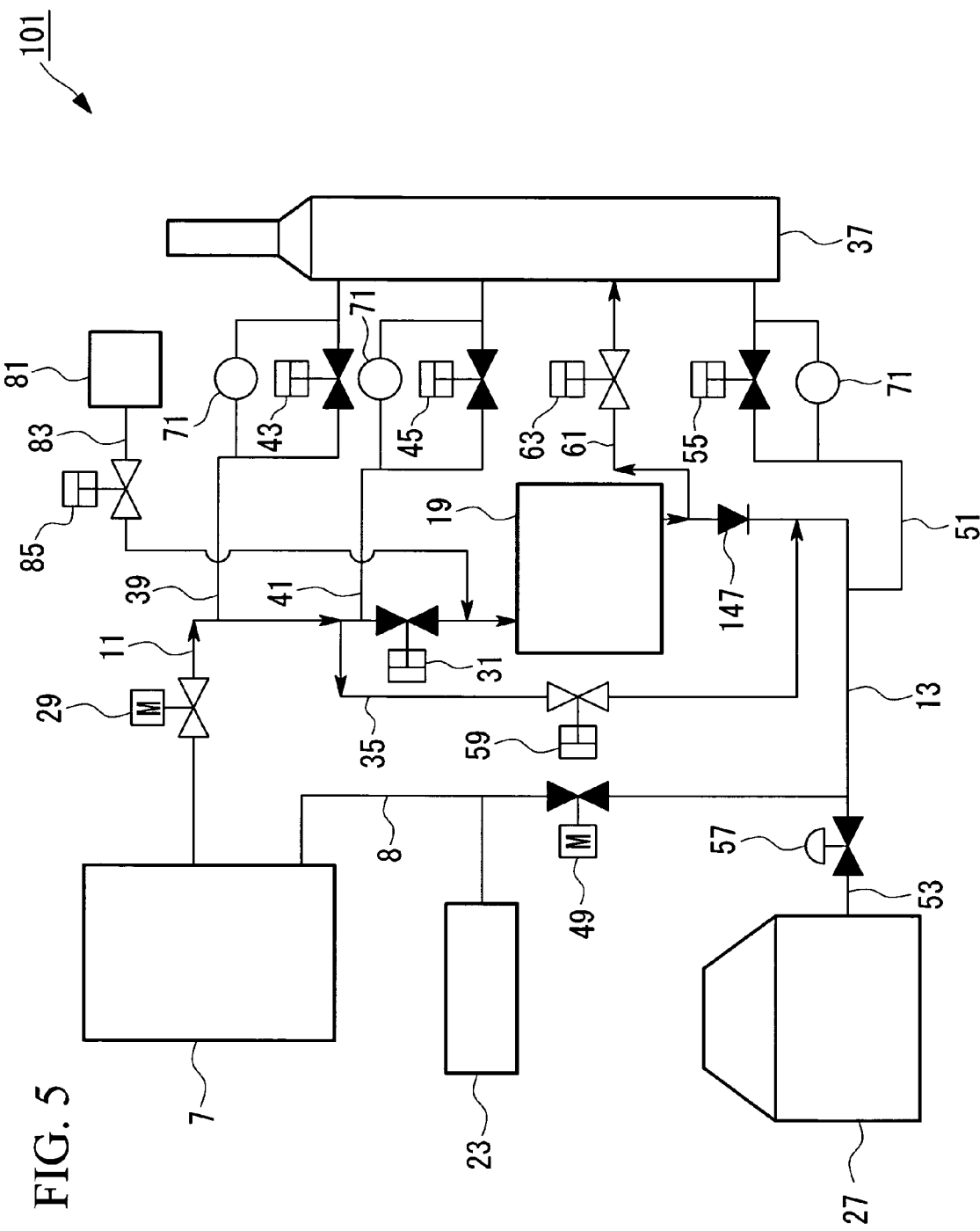
FIG. 5 is a schematic view of a combined power plant according to a second embodiment of the present invention.

FIG. 5 is a schematic view of a combined power plant according to this embodiment.

Components that are the same as those according to the first embodiment are represented by the same reference numerals.

As shown in FIG. 5, a check valve (second control unit) 147 and a second motor valve 49 are provided, in this order from the gas turbine power generating unit 3 side, in a second steam pipe 13 of a combined power plant 101.

The check valve 147 allows steam to flow only in the direction from the gas turbine power generating unit 3 to the steam turbine power generating unit 5.

A bypass pipe 35, a third discharge pipe 51 that guides the steam to the flush pipe 37, and a fourth discharge pipe 53 that guides the steam to the condenser 27 are connected, in this order from the check valve 147 to the second motor valve 49, to the second steam pipe 13. The second steam pipe 13 that supplies stream from the second motor valve 49 to the steam turbine 23 is connected to a steam supplying pipe 8 that supplies stream from the exhaust-heat recovery boiler 7 to the steam turbine 23.

Next, the operation from temporary shut down to restarting, which characterizes the combined power plant 101 according to this embodiment, will be described. The method of generating electric power during normal operation for the combined power plant 101 according to this embodiment is the same as that according to the first embodiment; therefore, a description thereof will not be repeated.

As shown in FIG. 5, when the combined power plant 101 is shut down temporarily, the first on-off valve 31, the second motor valve 49, the first discharge valve 43, the second discharge valve 45, the third discharge valve 55, and the fourth discharge valve 57 are closed.

On the other hand, the first motor valve 29, the bypass valve 59, the fifth discharge valve 63, and the air supplying valve 85 are opened.

In this state, the air supplying unit 81 supplies dry air to the gas turbine 19 of the gas turbine power generating unit 3 in order to push out the steam inside the gas turbine 19 to the atmosphere through the fifth discharge pipe 61 and the flush pipe 37. At this time, the first and second steam pipes 11 and 13 and the bypass pipe 35 are filled with steam.

Here, the pressure of the dry air supplied from the air supplying unit 81 is set to a pressure lower than that of the steam inside the second steam pipe 13. Therefore, the pressure difference between the dry air and the steam causes the check valve 147 to close, thus preventing the steam from flowing into the gas turbine 19.

Subsequently, when the combined power plant 101 is restarted, first the gas turbine power generating unit 3 is started up, and then the steam turbine power generating unit 5 is started up.

When starting up the gas turbine power generating unit 3, the first on-off valve 31 is opened and the air supplying valve 85 is closed after warm-up of the first steam pipe 11 is completed. In this way, the dry air in the gas turbine 19 is replaced with steam. Then, the bypass valve 59 and the fifth discharge valve 63 are closed, and the fourth discharge valve 57 is opened. The steam flows from the first steam pipe 11 through the gas turbine 19 and the second steam pipe 13 to the condenser 27. While the steam continues to be recovered to the condenser 27, when steam conditions are set, the second motor valve 49 is opened to allow the steam to flow into the steam turbine 23.

According to the above-described structure, by using the check valve 147, steam can be prevented from flowing into the gas turbine 19 from the second steam pipe 13 without opening or closing the valves. Since the check valve 147, which is inexpensive compared with an on-off valve, is used, production costs of the combined power plant 101 can be reduced.

Third Embodiment

Next, a third embodiment of the present invention will be described with reference to FIG. 6.

The basic structure of the combined power plant according to this embodiment is the same as that according to the first embodiment. However, the structure of the first steam pipe differs from that according to the first embodiment. Therefore, in this embodiment, only the first steam pipe and its periphery will be described with reference to FIG. 6, and the structures of the other components will not be described again.

Figure 6:
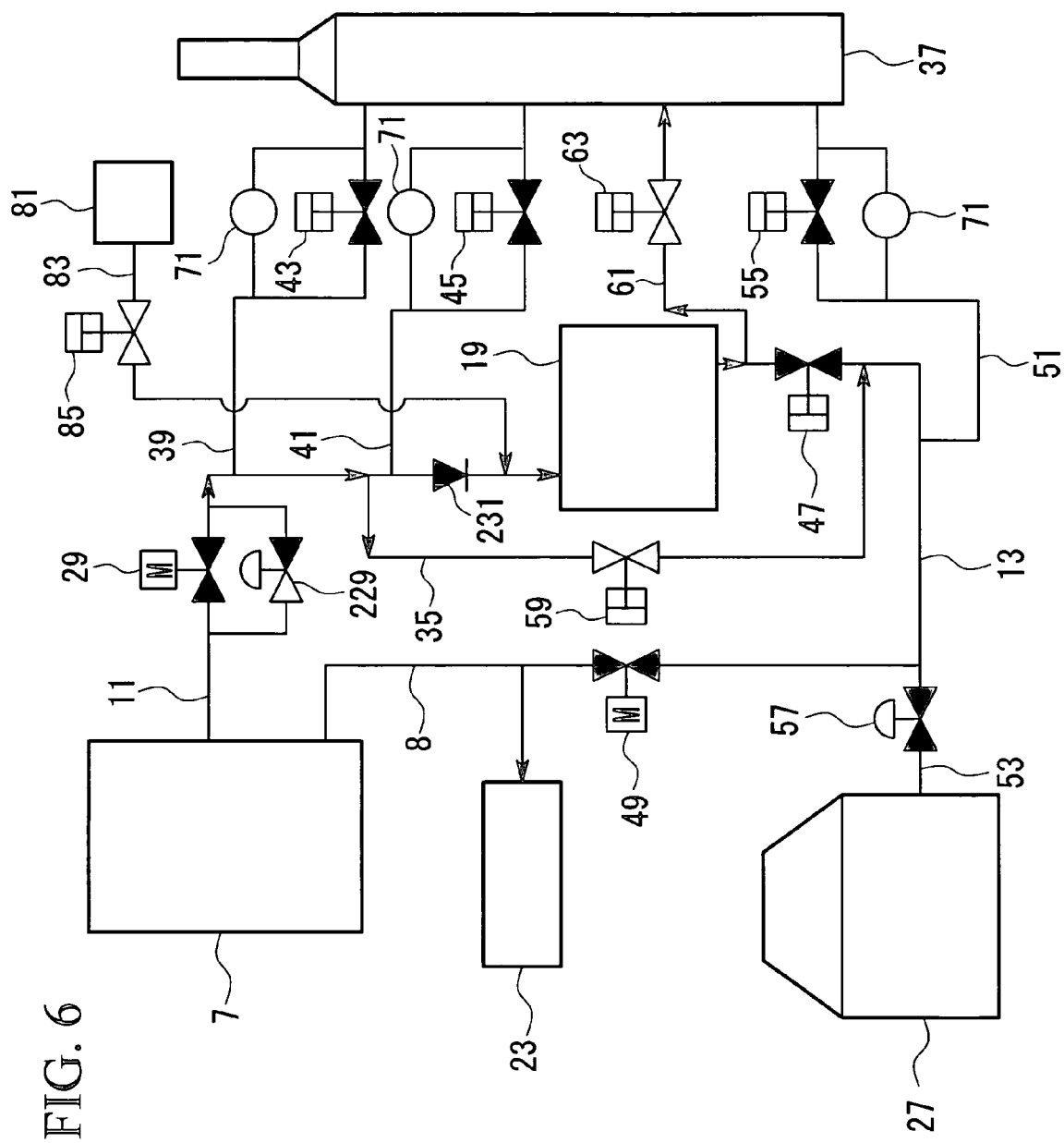
FIG. 6 is a schematic view of a combined power plant according to a third embodiment of the present invention.

FIG. 6 is a schematic view of a combined power plant according to this embodiment.

Components that are the same as those according to the first embodiment are represented by the same reference numerals.

As show in FIG. 6, a first motor valve 29, a pressure regulating valve (pressure regulating unit) 229 and a check valve (first control unit) 231 are provided, in this order from the exhaust-heat recovery boiler 7 side, in a first steam pipe 11 of a combined power plant 201.

The pressure regulating valve 229 regulates the pressure of steam supplied from the exhaust-heat recovery boiler 7 to the gas turbine 19. The pressure regulating valve 229 is disposed in the first steam pipe 11 in series with the first motor valve 29.

The check valve 231 allows steam to flow only in the direction from the exhaust-heat recovery boiler 7 to the gas turbine 19.

The pressure regulating valve 229 is not particularly limited, and when the first motor valve 29 is a valve whose degree of opening can be adjusted by inching, the pressure regulating valve 229 does not have to be provided in the first steam pipe 11 as described above.

Next, the operation from temporary shut down to restarting, which characterizes the combined power plant 201 according to this embodiment, will be described. The method of generating electric power during normal operation for the combined power plant 201 according to this embodiment is the same as that according to the first embodiment; therefore, a description thereof will not be repeated.

As shown in FIG. 6, when the combined power plant 201 is shut down temporarily, the first motor valve 29, the second on-off valve 47, the second motor valve 49, the first discharge valve 43, the second discharge valve 45, the third discharge valve 55, and the fourth discharge valve 57 are closed.

On the other hand, the bypass valve 59, the fifth discharge valve 63, and the air supplying valve 85 are opened, and the pressure regulating valve 229 is set to a predetermined degree of opening.

In this state, the air supplying unit 81 supplies dry air to the gas turbine 19 of the gas turbine power generating unit 3 in order to push out the steam inside the gas turbine 19 to the atmosphere through the fifth discharge pipe 61 and the flush pipe 37. At this time, the first and second steam pipes 11 and 13 and the bypass pipe 35 are filled with steam whose pressure is reduced by the pressure regulating valve 229.

Here, the pressure of the dry air supplied from the air supplying unit 81 is set to a pressure higher than that of the steam inside the first steam pipe 11. Therefore, the pressure difference between the dry air and the steam causes the check valve 231 to close, thus preventing the steam from flowing into the gas turbine 19.

Subsequently, when the combined power plant 201 is restarted, first the gas turbine power generating unit 3 is started up, and then the steam turbine power generating unit 5 is started up.

When starting up the gas turbine power generating unit 3, the first motor valve 29 is opened and the air supplying valve 85 is closed after warm-up of the first steam pipe 11 is completed. In this way, the dry air in the gas turbine 19 is replaced with steam. Then, the bypass valve 59 and the fifth discharge valve 63 are closed, and the second on-off valve 47 and the fourth discharge valve 57 are opened. The steam flows from the first steam pipe 11 through the gas turbine 19 and the second steam pipe 13 to the condenser 27. While the steam continues to be recovered to the condenser 27, when steam conditions are set, the second motor valve 49 is opened to allow the steam to flow into the steam turbine 23.

According to the above-described structure, by using the check valve 231, steam can be prevented from flowing into the gas turbine 19 by merely supplying air with a pressure higher than that of the steam to the gas turbine 19. Therefore, it is easy to control the flow of air and steam in the inflow area of the gas turbine 19. Since the check valve 231, which is inexpensive compared with an on-off valve, is used, production costs of the combined power plant 201 can be reduced.

Since the pressure of steam applied to the check valve 231 can be decreased by the pressure regulating valve 229, the pressure of air supplied to the gas turbine 19 can be decreased. Therefore, the supply pressure required for the air supplying unit 81 can be kept low.

What is claimed is:

1. A combined power plant comprising:
    a gas turbine power generating unit having a gas turbine;
    a steam turbine power generating unit having a steam turbine;
    a steam supplying unit configured to supply steam to the gas turbine and the steam turbine;
    a first steam pipe configured to guide the steam from the steam supplying unit to the gas turbine;
    a second steam pipe configured to guide the steam from the gas turbine to the steam turbine;
    a first control unit configured to control the inflow of the steam from the first steam pipe to the gas turbine;
    a second control unit configured to control the outflow of the steam from the gas turbine to the second steam pipe;
    a fluid supplying unit connected to the first steam pipe at a point between the first control unit and the gas turbine via a fluid supplying valve that controls the flow of fluid into the gas turbine, the fluid supplying unit being configured to introduce a fluid into the gas turbine in order to push the steam from inside the gas turbine out of the gas turbine into the atmosphere;
    a discharge pipe connected to the second steam pipe between the gas turbine and the second control unit and configured to discharge the steam from inside the gas turbine out into the atmosphere in response to introduction of the fluid into the gas turbine;
    a discharge unit provided in the discharge pipe to control the flow of steam in the discharge pipe;
    a bypass pipe configured to guide the steam in the first steam pipe to the second steam pipe;
    a third control unit provided in the bypass pipe to control the flow of steam in the bypass pipe;
    wherein the third control unit closes the bypass pipe during normal operation such that the steam does not flow from the first steam pipe to the second steam pipe via the bypass pipe, and
    wherein, when the combined power plant is shut down, the first control unit stops the inflow of steam from the first steam pipe to the gas turbine and the second control unit stops the outflow of steam from the gas turbine to the second steam pipe to disconnect the gas turbine from the first steam pipe and the second steam pipe, and the third control unit connects the first steam pipe to the second steam pipe via the bypass pipe such that steam flows in the bypass pipe, and
    the fluid supplying valve permits the flow of fluid from the fluid supplying unit into the gas turbine such that the fluid supplying unit supplies fluid to the gas turbine to discharge steam from inside the gas turbine.

2. The combined power plant according to claim 1, wherein the second control unit comprises a check valve configured to allow a fluid to flow only in the direction from the gas turbine to the second steam pipe.

3. The combined power plant according to claim 1,
    wherein the first control unit comprises a check valve configured to allow a fluid to flow only in the direction from the first steam pipe to the gas turbine, and
    wherein a pressure regulating unit configured to regulate the pressure of the steam is provided in the first steam pipe interposed between the steam supplying unit and the first control unit.

* * * * *